United States Patent
Mehta et al.

(10) Patent No.: US 10,936,704 B2
(45) Date of Patent: Mar. 2, 2021

(54) STOLEN MACHINE LEARNING MODEL IDENTIFICATION

(71) Applicant: International Business Machines Corporation, Armonk, NY (US)

(72) Inventors: Sameep Mehta, New Delhi (IN); Rakesh R. Pimplikar, Nagpur (IN); Karibik Sankaranarayanan, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 263 days.

(21) Appl. No.: 15/901,706

(22) Filed: Feb. 21, 2018

(65) Prior Publication Data

US 2019/0258783 A1    Aug. 22, 2019

(51) Int. Cl.
*G06F 21/16* (2013.01)
*G06N 20/00* (2019.01)

(52) U.S. Cl.
CPC ............ *G06F 21/16* (2013.01); *G06N 20/00* (2019.01); *G06F 2221/0737* (2013.01)

(58) Field of Classification Search
None
See application file for complete search history.

(56) References Cited

U.S. PATENT DOCUMENTS

| 10,339,468 B1* | 7/2019 | Johnston | G06N 20/20 |
| 2008/0209543 A1* | 8/2008 | Aaron | G06F 21/35 726/17 |

(Continued)

FOREIGN PATENT DOCUMENTS

WO    WO2016043734 A1    3/2016

OTHER PUBLICATIONS

Barreno, Marco et al., "Can Machine Learning Be Secure?", ACM Symposium on Information, Computer, and Communication Security, ASIACCS '06, Mar. 21-24, 2006, Taipei, Taiwan, 10 pages, ACM Digital Library.

(Continued)

*Primary Examiner* — Henry Tsang
(74) *Attorney, Agent, or Firm* — Ference & Associates LLC

(57) ABSTRACT

One embodiment provides a method, including: assigning a machine learning model signature to a machine learning model, wherein the machine learning model signature is generated using (i) data points and (ii) corresponding data labels from training data; receiving input comprising identification of a target machine learning model; acquiring a target signature for the target machine learning model by generating a signature for the target machine learning model using (i) data points from the assigned machine learning model signature and (ii) labels assigned to those data points by the target machine learning model; determining a stolen score by comparing the target signature to the machine learning model signature and identifying the number of data labels that match between the target signature and the machine learning model signature; and classifying the target machine learning model as stolen based upon the stolen score reaching a predetermined threshold.

18 Claims, 3 Drawing Sheets

(56) References Cited

U.S. PATENT DOCUMENTS

| | | | |
|---|---|---|---|
| 2015/0055855 A1* | 2/2015 | Rodriguez | G06F 21/16 |
| | | | 382/159 |
| 2016/0124676 A1* | 5/2016 | Jain | G06F 9/45558 |
| | | | 713/176 |
| 2016/0358100 A1* | 12/2016 | Natroshvili | G06N 20/00 |
| 2017/0024660 A1 | 1/2017 | Chen et al. | |
| 2017/0091658 A1* | 3/2017 | Matthiesen | G06F 21/00 |
| 2017/0161643 A1* | 6/2017 | Hoover | G06Q 30/06 |
| 2017/0206449 A1* | 7/2017 | Lain | G06N 3/02 |

OTHER PUBLICATIONS

Shokri, Reza et al., "Membership Inference Attacks Against Machine Learning Models", In the Proceedings of the IEEE Symposium on Security and Privacy, 2017, Cornell University Library, Mar. 31, 2017, 16 pages, Cornell University Library.

* cited by examiner

STOLEN MACHINE LEARNING MODEL IDENTIFICATION

BACKGROUND

Machine learning is the ability of a computer to learn without being explicitly programmed to perform some function. Thus, machine learning allows a programmer to initially program an algorithm that can be used to predict responses to data, without having to explicitly program every response to every possible scenario that the computer may encounter. In other words, machine learning uses algorithms that the computer uses to learn from and make predictions with regard to data. Machine learning provides a mechanism that allows a programmer to program a computer for computing tasks where design and implementation of a specific algorithm that performs well is difficult or impossible. To implement machine learning, the computer is initially taught using machine learning models from sample inputs. The computer can then learn from the machine learning model in order to make decisions when actual data are introduced to the computer. The machine learning models are produced using training data that are used to train the machine learning model responses.

BRIEF SUMMARY

In summary, one aspect of the invention provides a method, comprising: utilizing at least one processor to execute computer code that performs the steps of: assigning a machine learning model signature to a machine learning model, wherein the machine learning model signature is generated using (i) data points from training data used to train the machine learning model and (ii) corresponding data labels assigned using the trained machine learning model; receiving input comprising an identification of a target machine learning model in use by an entity other than the entity that developed the machine learning model, wherein the target machine learning model comprises a machine learning model suspected of being stolen; acquiring a target signature for the target machine learning model by generating a signature for the target machine learning model using (i) data points from the assigned machine learning model signature and (ii) labels assigned to those data points by the target machine learning model; determining a stolen score by comparing the target signature to the machine learning model signature and identifying the number of data labels that match between the target signature and the machine learning model signature; and classifying the target machine learning model as stolen based upon the stolen score reaching a predetermined threshold.

Another aspect of the invention provides an apparatus, comprising: at least one processor; and a computer readable storage medium having computer readable program code embodied therewith and executable by the at least one processor, the computer readable program code comprising: computer readable program code configured to assign a machine learning model signature to a machine learning model, wherein the machine learning model signature is generated using (i) data points from training data used to train the machine learning model and (ii) corresponding data labels assigned using the trained machine learning model; computer readable program code configured to receive input comprising an identification of a target machine learning model in use by an entity other than the entity that developed the machine learning model, wherein the target machine learning model comprises a machine learning model suspected of being stolen; computer readable program code configured to acquire a target signature for the target machine learning model by generating a signature for the target machine learning model using (i) data points from the assigned machine learning model signature and (ii) labels assigned to those data points by the target machine learning model; computer readable program code configured to determine a stolen score by comparing the target signature to the machine learning model signature and identifying the number of data labels that match between the target signature and the machine learning model signature; and computer readable program code configured to classify the target machine learning model as stolen based upon the stolen score reaching a predetermined threshold.

An additional aspect of the invention provides a computer program product, comprising: a computer readable storage medium having computer readable program code embodied therewith, the computer readable program code executable by a processor and comprising: computer readable program code configured to assign a machine learning model signature to a machine learning model, wherein the machine learning model signature is generated using (i) data points from training data used to train the machine learning model and (ii) corresponding data labels assigned using the trained machine learning model; computer readable program code configured to receive input comprising an identification of a target machine learning model in use by an entity other than the entity that developed the machine learning model, wherein the target machine learning model comprises a machine learning model suspected of being stolen; computer readable program code configured to acquire a target signature for the target machine learning model by generating a signature for the target machine learning model using (i) data points from the assigned machine learning model signature and (ii) labels assigned to those data points by the target machine learning model; computer readable program code configured to determine a stolen score by comparing the target signature to the machine learning model signature and identifying the number of data labels that match between the target signature and the machine learning model signature; and computer readable program code configured to classify the target machine learning model as stolen based upon the stolen score reaching a predetermined threshold.

A further aspect of the invention provides a method, comprising: utilizing at least one processor to execute computer code that performs the steps of: determining that a suspicious machine learning model has been stolen from an entity other than the entity using the suspicious machine learning model by: obtaining a signature for the suspicious machine learning model by accessing (i) data points from a signature of an original machine learning model and (ii) corresponding data labels assigned to those data points by the suspicious machine learning model; comparing the obtained signature to a signature assigned to the original machine learning model belonging to the entity other than the entity using the suspicious machine learning model, wherein the signature assigned to the machine learning model is generated using (i) data points from training data used to train the machine learning model and (ii) corresponding data labels assigned using the trained machine learning model; and determining that a stolen score is above a predetermined threshold, wherein the stolen score is computed based upon the comparison and identifying a number of matches between the obtained signature and the signature associated with the machine learning model.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
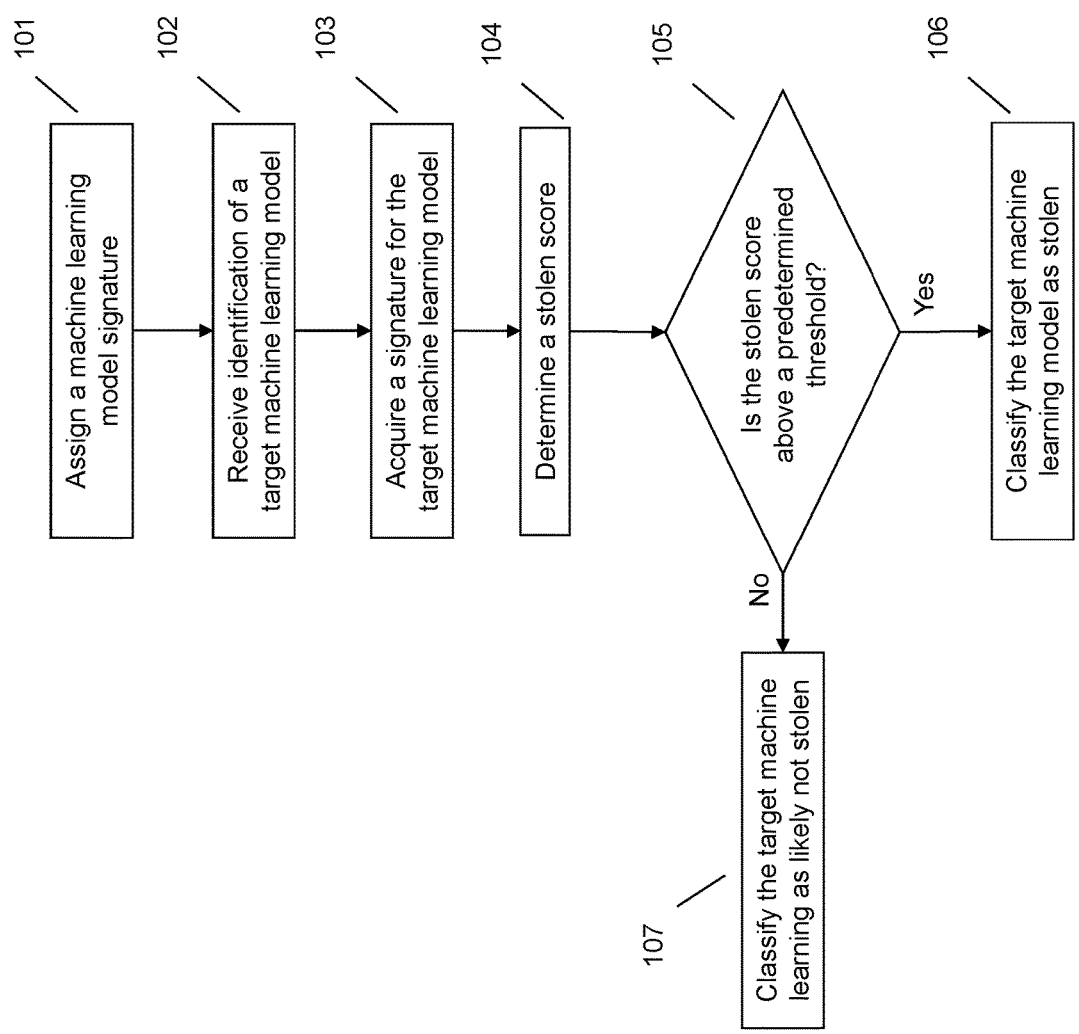
FIG. 1 illustrates a method of identifying if a target machine learning model has been stolen from another entity.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

Building machine learning models is very labor-intensive and, therefore, expensive. Additionally, the training data that are used to train the model are usually gold standard data which take a significant amount of research to identify and compile. The machine learning models are often built and hosted using cloud services. An entity may build and host the machine learning model using cloud services so that the machine learning model can be accessible from a plurality of different locations. This allows multiple people in different locations to work on building the machine learning model. Additionally, once the machine learning model has been built, the machine learning model can be accessed from different locations. Additionally, because the machine learning model is built and hosted on the cloud service, the entity does not have to provide data storage for the machine learning model and ancillary data, for example, training data used to train the machine learning model.

Since the machine learning models and training data are difficult to produce, adversaries try to steal the machine learning models and/or training data. The fact that the machine learning models are built and/or hosted using cloud services makes the ability of adversaries to steal the machine learning models and/or training data easier. The adversaries then use the machine learning models and/or training data for their benefit. The adversaries may also release the machine learning models and/or training data as cloud services, which results in a significant loss to the real owners of the machine learning model and/or training data. Thus, there is a desire by producers of machine learning models and the training data used to train the machine learning model to prevent theft of the machine learning model and/or training data. However, as new techniques for preventing the theft of the machine learning models and/or training data are produced, new techniques for stealing the machine learning models and/or training data are also produced. Therefore, it is not possible to completely prevent theft of the machine learning models and/or training data.

Accordingly, the techniques and systems as described herein provide a technique for identifying if a target machine learning model is a stolen machine learning model. In other words, the techniques and systems as described herein provide a mechanism that allows an entity to determine if a machine learning model that is on the public domain corresponds to a machine learning model generated by the entity. The system and methods as described herein assign a unique signature to a machine learning model. The signature is generated using data points and data labels from the machine learning model and/or training data used to train the machine learning model.

Once a target machine learning model has been identified as suspicious, for example, the target machine learning model is suspected of being a stolen machine learning model, the system can generate a signature for the target machine learning model. If the machine learning model is stolen, the data points and labels will be the same or similar between the original machine learning model and the target machine learning model. Thus, in generating this signature, the system uses the data points that correspond to the data points used in generating the original signature. In other words, the data points and corresponding labels for generating both the original signature and the target signature are taken from the same locations in both the original machine learning model and the target machine learning model. The system then compares the signatures from the original machine learning model and the target machine learning model to determine if there is any overlap between the signatures. If the overlap reaches a particular threshold, the system can identify the machine learning model as possibly stolen.

Such a system provides a technical improvement over current techniques for managing machine learning models. Specifically, the systems provide a technique that allows for identification of a machine learning model as stolen. Conventional techniques are directed to prevention of the theft of machine learning models and/or training data. However, no technique exists for identifying whether a machine learning model is a stolen machine learning model. In other words, once the machine learning model has been stolen, conventional techniques do not provide for a method for identifying if a target machine learning model corresponds to another machine learning model. Thus, the systems and techniques as described herein provide for such a technique, thereby allowing entities to recognize when a machine learning model has been stolen and is in use by another entity. The entity can then take additional actions with regard to this theft.

FIG. 1 illustrates a method for identifying whether a target machine learning model corresponds to a machine learning model belonging to a different entity, thereby identifying the target machine learning model as stolen. At 101 the system assigns a machine learning model signature to a machine learning model. The machine learning model may be a classification model that is defined by one or more decision boundaries. The decision boundary is a portion of the model which defines two or more separate classes or sets. In other words, the decision boundary is the location within the classifier in which all points on one side of the boundary will be classified into one class and where all points on the other side of the boundary will be classified into a different class. Data points within the classification model are given labels based upon the location of the data point with respect to the decision boundary. Thus, if the data point is located on one side of the decision boundary it will have one data label. However, if the same data point was on the other side of the decision boundary, it would have a different label. Thus, labels for data points that fall very close to the decision boundary would change with small changes to the decision boundary.

The system assigns a machine learning model signature to the machine learning model that is generated using data points and corresponding data labels for those data points. The machine learning model signature may be generated during generation of the machine learning model, or may be generated after the machine learning model has been created. To generate the machine learning model signature the system uses data points from training data used to train the machine learning model, and corresponding data labels assigned using the same trained machine learning model. Additionally, the chosen data points are those that fall within a predetermined distance from the decision boundary. These particular data points are chosen because, as stated above, a slight change in the decision boundary would change the labels assigned to the data points. Thus, if a different entity created a similar machine learning model, the likeliness that similar data points would have the same data labels is reduced. This helps prevent false positives with regard to detection of a stolen machine learning model, as described in more detail herein. The predetermined distance may include a distance chosen by the programmer or other entity. In other words, the predetermined distance may be unique for each machine learning model and/or training data, each entity that generates machine learning models, or the like.

Determining the number of data points and labels to be used for the signature may be selected by the programmer or other entity. The number of points for the signature may also correspond to the number of data points that are within the predetermined distance from the decision boundary. In other words, if the machine learning model training data includes fifty points within the predetermined distance, the signature may include all fifty points. Thus, the length of the signature may be any value. However, this length must be known by the entity attempting to determine if a target machine learning model corresponds to a stolen machine learning model. The length of the signature may have some minimum length value. For example, in order to accurately identify whether a machine learning model is a stolen machine learning model, the signature may need to be at least a particular length. This particular length may be user selectable or may be a default value. Accordingly, if the training data do not have enough data points located near the decision boundaries, the system may use explicit data points located near the decision boundaries. In other words, the system may use data points that are found in the trained machine learning model, rather than only within the training data used to train the machine learning model.

Once the desired number of data points and corresponding labels are identified, the system may sort the data points and data labels. Sorting may be performed in ascending order, descending order, most frequently used, or the like. The sorting may be based upon the data point value, data label, or a combination thereof. Once the data points and corresponding labels are sorted, the sorted data points may be added to the signature. Alternatively, only the sorted data labels may be added to the signature. Once all data points and/or data labels are added to the signature, the signature is returned to the system. Thus, the signature may be a series of the sorted labels of the data points that lie within a predetermined distance from a decision boundary point.

At 102 the system may receive input comprising an identification of a target machine learning model. The target machine learning model may be a machine learning model that is in use by an entity other than the entity that developed the machine learning model. In other words, the target machine learning model may include a machine learning model that an entity suspects has been stolen from the entity. Receiving the input may include receiving input from a user identifying a target machine learning model. Alternatively, the system may access public domains and access machine learning models on the public domains to test whether a machine learning model accessible from the public domain has been stolen. In other words, the system itself may mine for machine learning models to be tested. In mining for the machine learning models, the system may also identify a known machine learning model that may be similar or perform a similar function as the mined machine learning model, so that the system may perform the analysis. Receiving the identification may include receiving a link or pointer to the location of the target machine learning model, file of the target machine learning model, or other location for accessing the target machine learning model. Alternatively, receiving the identification may include receiving a file including the target machine learning model, receiving a file including data from the target machine learning model, or the like.

At 103 the system may acquire a target signature for the target machine learning model. Acquiring the target signature may include generating a signature for the target machine learning model. Generating this target signature may be performed using the same technique as generation of the machine learning model signature, as described in connection with 101. However, the target signature may not be based upon the machine learning model training data, as these data may be inaccessible. Rather, the target signature may be generated using the data points from the signature of the original machine learning model and labels assigned to those data points by the target machine learning model. In other words, to generate the target signature, the system uses the data points of the original machine learning model that were used to generate the signature of the original machine learning model. The system then identifies the data labels that are assigned to those data points by the target machine learning model. For example, the system feeds the data points to the target machine learning model and then receives the data labels back from the target machine learning model. If the target machine learning model is a stolen version of the original machine learning model, the labels generated by the target machine learning model will be similar, if not the same, as the labels assigned by the original machine learning model. In other words, in a stolen version of the original machine learning model the decision boundary will be in the same location, thereby causing data points to fall on the same side of the decision boundary as in the original machine learning model and generate the same labels for data points.

Once the data points and corresponding data labels have been identified and pulled, the system sorts the data points and corresponding data labels in the same manner as when generating the original machine learning model signature. In other words, if the system sorted the data points and labels in ascending order when generating the original signature, the system will sort the data points and labels for the target signature in ascending order. The system then compiles the sorted data points and/or labels into a target signature for the target machine learning model. This target signature should be the same or a similar length as the signature created for the original machine learning model. Once all the data points and/or labels have been compiled into a target signature, the system returns the target signature.

At 104 the system determines a stolen score to be assigned to or associated with the target machine learning model. To determine a stolen score the system compares the original machine learning model signature to the target machine learning model signature. Specifically, the system compares each of the data labels and/or data points included in the original machine learning model signature to each of the data labels and/or data points included in the target machine learning model signature. This comparison occurs over the length of the signature. Once the system has finished comparing the two signatures, the system makes a determination of how many data labels match between the two signatures. In other words, the system makes a comparison between the data labels that are generated using the training data on the original machine learning model and the data labels that are generated using the same training data on the target or suspicious machine learning model. As an example, the system may increase a counter every time that a data label matches between the two signatures. In this example, the system may then divide the number of matching or overlapping data labels by the length of the signature in order to determine a ratio or proportion of matching data labels to non-matching labels. In other words, the system may determine a percentage of data labels that match as compared to the non-matching labels.

The stolen score identifies how likely it is that the target machine learning model has been stolen. In other words, the stolen score provides an indication of a confidence of whether the target machine learning model is stolen. The lower the stolen score, the less likely that the target machine learning model is stolen. The higher the stolen score, the more likely that the target machine learning model is stolen. In other words, a lower score indicates a lower similarity between the target machine learning model and the original machine learning model, while a higher score indicates a higher similarity between the target machine learning model and the original machine learning model.

At 105 the system may determine if the stolen score has met or exceeded a predetermined threshold. To make this determination, the system may compare the stolen score to the predetermined threshold. The predetermined threshold may be set by the user, a default value, or a combination thereof. The predetermined threshold may be a value that is set based upon what percentage of matching labels likely indicates that a machine learning model likely corresponds to an original machine learning model, for example, 90%, 75%, 50%, or the like. The predetermined value may also change based upon the machine learning model, the entity checking for stolen models, or the like. For example, a programmer may determine that the data points are so close to the decision boundary that by simply recompiling, the model may generate a certain percentage of data labels that will not match. Thus, the predetermined threshold value may be set to a lower value as compared to a machine learning model that has more consistent data labels.

If the stolen score does not meet or exceed the predetermined threshold at 105, the system may not classify the target machine learning model as stolen at 107. In other words, the system may classify the target machine learning model as likely not stolen. If, however, the stolen score does meet, exceed, or otherwise reach the predetermined threshold at 105, the system may classify the target machine learning model as stolen at 106. Once the target machine learning model has been classified as likely or possibly stolen, the system may perform some additional actions, for example, notifying a user, flagging the target machine learning model as possibly stolen, or the like.

Figure 2:
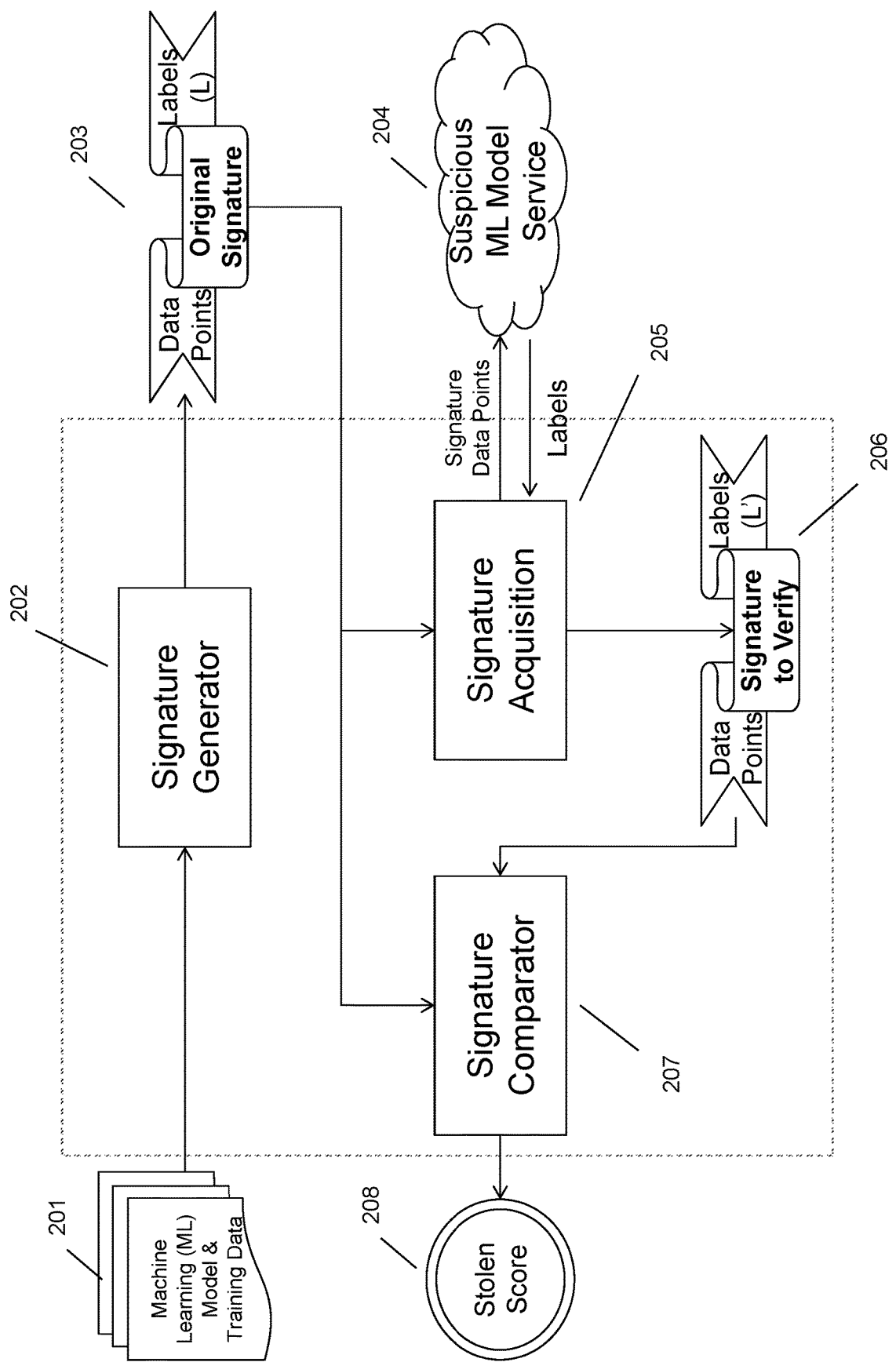
FIG. 2 illustrates a system for identification if a target machine learning model has been stolen from another entity.

FIG. 2 illustrates an example system architecture of the system described herein. The system accesses the machine learning model and training data 201. The system uses a signature generator 202 to generate a signature for the machine learning model using the machine learning model and training data 201. The system then returns an original signature 203 that is based upon the data points and corresponding labels of the machine learning model and/or training data 201. In a parallel path, the system accesses a suspicious machine learning model service 204. The system uses a signature acquisition means 205 to generate a signature for the suspicious machine learning model service 204 using the same data points as used in generating the signature for the original signature 203 and identifies the labels assigned to those data points by the target machine learning model service 204. The system then returns a signature to verify 206 that is based upon the data points of the original machine learning model and labels assigned to those data points by the suspicious machine learning model service 204. Using a signature comparator 207 the system compares the original signature 203 and the signature to verify 206. The output is a stolen score 208 that the system can then use to determine a likeliness or confidence that the suspicious machine learning model service 204 corresponds to the original machine learning model 201. In other words, the system can identify whether the suspicious machine learning model service 204 is a stolen version of the original machine learning model 201.

Figure 3:
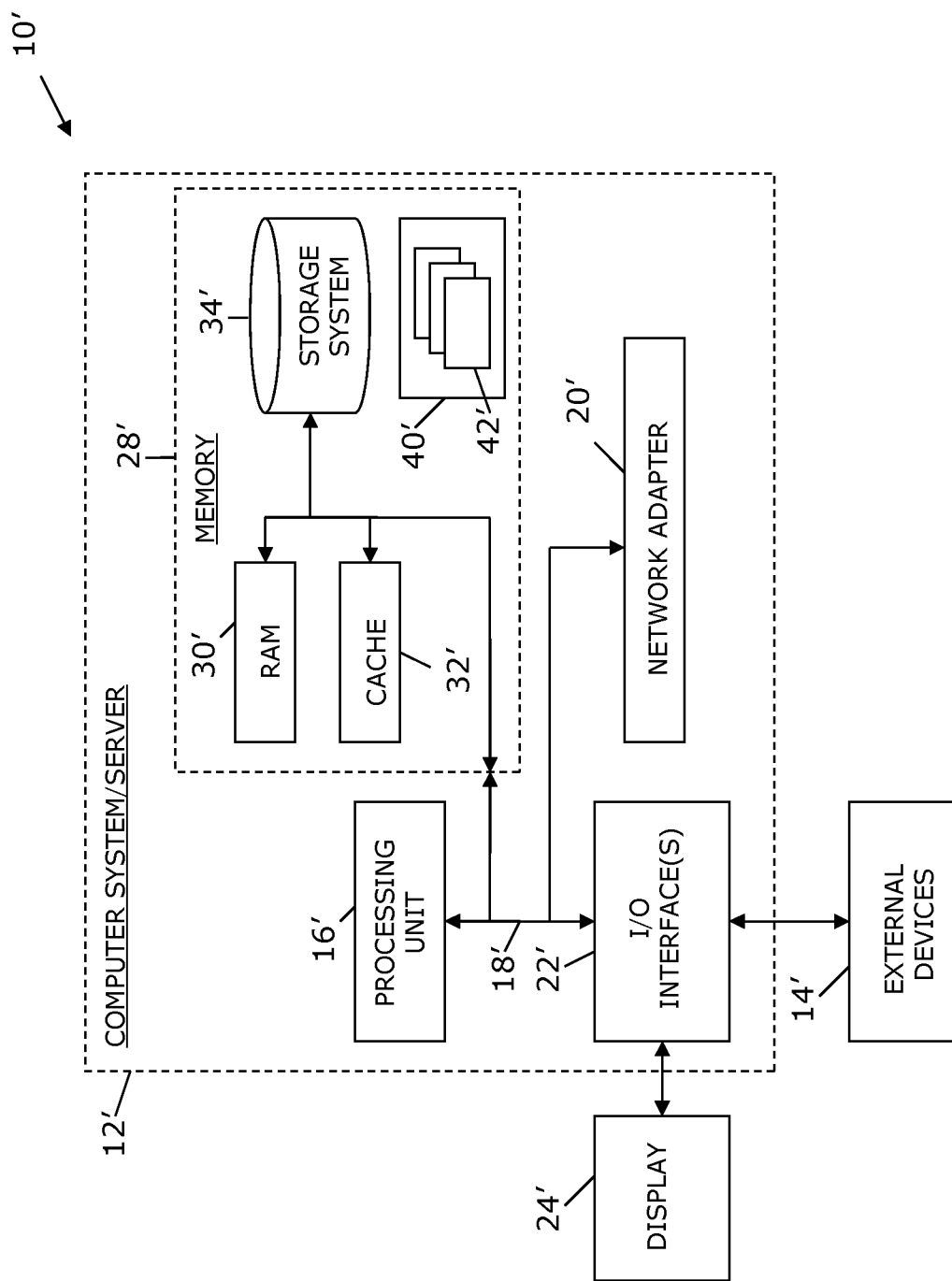
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
utilizing at least one processor to execute computer code that performs the steps of:
assigning a machine learning model signature to a machine learning model, wherein the machine learning model signature is generated using (i) data points from training data used to train the machine learning model and (ii) corresponding data labels assigned to the data points using the machine learning model trained using the training data, wherein the data points used in the machine learning model signature comprise data points that fall within a predetermined distance from a decision boundary of the machine learning model, wherein a length of the machine learning model signature corresponds to a number of the data points that fall within the predetermined distance from the decision boundary, wherein generating the machine learning model signature comprises sorting the data points and adding the sorted data points to the machine learning model signature;
receiving input comprising an identification of a target machine learning model in use by an entity other than the entity that developed the machine learning model, wherein the target machine learning model comprises a machine learning model suspected of being stolen;
acquiring a target signature for the target machine learning model by generating a signature for the target machine learning model using (i) data points from the assigned machine learning model signature and (ii) labels assigned to those data points by the target machine learning model, wherein the generating a signature for the target machine learning model comprises generating a signature having a length equal to the length of the machine learning model signature;

determining a stolen score by comparing the target signature to the machine learning model signature and identifying the number of data labels that match between the target signature and the machine learning model signature; and classifying the target machine learning model as stolen based upon the stolen score reaching a predetermined threshold.

2. The method of claim 1, wherein the data points comprise data points near a decision boundary of training data of the machine learning model.

3. The method of claim 2, wherein the data points, when the training data does not have enough data points at the decision boundary, comprise data points near a decision boundary of the machine learning model.

4. The method of claim 1, wherein the generating a signature for the target machine learning model comprises (i) providing the data points from the assigned machine learning model signature to the target machine learning model and (ii) receiving the labels assigned to those data points from the target machine learning model.

5. The method of claim 1, wherein the determining a stolen score comprises dividing the number of matching data labels by the number of data labels included in the signature.

6. The method of claim 1, wherein the determining a stolen score comprises determining a percentage of data labels that match between the target signature and the machine learning model signature.

7. The method of claim 1, wherein the sorting the data points comprises (i) sorting the data points and corresponding data labels in ascending order and (ii) combining the data labels.

8. The method of claim 1, wherein the machine learning model signature is assigned to the machine learning model during generation of the machine learning model.

9. The method of claim 1, wherein the machine learning model comprises a classification model defined by one or more decision boundaries.

10. An apparatus, comprising:
at least one processor; and
a computer readable storage medium having computer readable program code embodied therewith and executable by the at least one processor, the computer readable program code comprising:
computer readable program code configured to assign a machine learning model signature to a machine learning model, wherein the machine learning model signature is generated using (i) data points from training data used to train the machine learning model and (ii) corresponding data labels assigned to the data points using the machine learning model trained using the training data, wherein the data points used in the machine learning model signature comprise data points that fall within a predetermined distance from a decision boundary of the machine learning model, wherein a length of the machine learning model signature corresponds to a number of the data points that fall within the predetermined distance from the decision boundary, wherein generating the machine learning model signature comprises sorting the data points and adding the sorted data points to the machine learning model signature;
computer readable program code configured to receive input comprising an identification of a target machine learning model in use by an entity other than the entity that developed the machine learning model, wherein the target machine learning model comprises a machine learning model suspected of being stolen;
computer readable program code configured to acquire a target signature for the target machine learning model by generating a signature for the target machine learning model using (i) data points from the assigned machine learning model signature and (ii) labels assigned to those data points by the target machine learning model, wherein the generating a signature for the target machine learning model comprises generating a signature having a length equal to the length of the machine learning model signature;
computer readable program code configured to determine a stolen score by comparing the target signature to the machine learning model signature and identifying the number of data labels that match between the target signature and the machine learning model signature; and
computer readable program code configured to classify the target machine learning model as stolen based upon the stolen score reaching a predetermined threshold.

11. A computer program product, comprising:
a computer readable storage medium having computer readable program code embodied therewith, the computer readable program code executable by a processor and comprising:
computer readable program code configured to assign a machine learning model signature to a machine learning model, wherein the machine learning model signature is generated using (i) data points from training data used to train the machine learning model and (ii) corresponding data labels assigned to the data points using the machine learning model trained using the training data, wherein the data points used in the machine learning model signature comprise data points that fall within a predetermined distance from a decision boundary of the machine learning model, wherein a length of the machine learning model signature corresponds to a number of the data points that fall within the predetermined distance from the decision boundary, wherein generating the machine learning model signature comprises sorting the data points and adding the sorted data points to the machine learning model signature;
computer readable program code configured to receive input comprising an identification of a target machine learning model in use by an entity other than the entity that developed the machine learning model, wherein the target machine learning model comprises a machine learning model suspected of being stolen;
computer readable program code configured to acquire a target signature for the target machine learning model by generating a signature for the target machine learning model using (i) data points from the assigned machine learning model signature and (ii) labels assigned to those data points by the target machine learning model, wherein the generating a signature for the target machine learning model comprises generating a signature having a length equal to the length of the machine learning model signature;
computer readable program code configured to determine a stolen score by comparing the target signature to the machine learning model signature and identifying the number of data labels that match between the target signature and the machine learning model signature; and computer readable program code configured to classify the target machine learning model as stolen based upon the stolen score reaching a predetermined threshold.

12. The computer program product of claim 11, wherein the data points comprise data points near a decision boundary of training data of the machine learning model.

13. The computer program product of claim 12, wherein the data points, when the training data does not have enough data points at the decision boundary, comprise data points near a decision boundary of the machine learning model.

14. The computer program product of claim 11, wherein the generating a signature for the target machine learning model comprises (i) providing the data points from the assigned machine learning model signature to the target machine learning model and (ii) receiving the labels assigned to those data points from the target machine learning model.

15. The computer program product of claim 11, wherein the determining a stolen score comprises dividing the number of matching data labels by the number of data labels included in the signature.

16. The computer program product of claim 11, wherein the determining a stolen score comprises determining a percentage of data labels that match between the target signature and the machine learning model signature.

17. The computer program product of claim 11, wherein the sorting the data points comprises (i) sorting the data points and corresponding data labels in ascending order and (ii) combining the data labels.

18. A method, comprising:
utilizing at least one processor to execute computer code that performs the steps of:
determining that a suspicious machine learning model has been stolen from an entity other than an entity using the suspicious machine learning model by:
obtaining a signature for the suspicious machine learning model by accessing (i) data points from a signature of an original machine learning model and (ii) corresponding data labels assigned to those data points by the suspicious machine learning model, wherein the data points from a signature of the original machine learning model comprise data points that fall within a predetermined distance from a decision boundary of the machine learning model, wherein a length of the original machine learning model signature corresponds to a number of the data points that fall within the predetermined distance from the decision boundary, wherein generating the original machine learning model signature comprises sorting the data points and adding the sorted data points to the original machine learning model signature, wherein the obtaining a signature for the suspicious machine learning model comprises generating a signature having a length equal to the length of the original machine learning model signature;
comparing the obtained signature to a signature assigned to the original machine learning model belonging to the entity other than the entity using the suspicious machine learning model, wherein the signature assigned to the machine learning model is generated using (i) data points from training data used to train the machine learning model and (ii) corresponding data labels assigned using the trained machine learning model; and
determining that a stolen score is above a predetermined threshold, wherein the stolen score is computed based upon the comparison and identifying a number of matches between the obtained signature and the signature associated with the machine learning model.

* * * * *